United States Patent
Cross et al.

(10) Patent No.: US 6,884,314 B2
(45) Date of Patent: Apr. 26, 2005

(54) CONDUCIVE, SILICONE-BASED COMPOSITIONS WITH IMPROVED INITIAL ADHESION REDUCED MICROVOIDING

(75) Inventors: Robert P. Cross, Rocky Hill, CT (US); Lester D. Bennington, East Hartford, CT (US)

(73) Assignee: Henkel Corporation, Rocky Hill, CT (US)

( * ) Notice: Subject to any disclaimer, the term of this patent is extended or adjusted under 35 U.S.C. 154(b) by 55 days.

(21) Appl. No.: 10/258,351

(22) PCT Filed: Apr. 23, 2001

(86) PCT No.: PCT/US01/11728

§ 371 (c)(1),
(2), (4) Date: Oct. 23, 2002

(87) PCT Pub. No.: WO02/086911

PCT Pub. Date: Oct. 31, 2002

(65) Prior Publication Data

US 2003/0164223 A1 Sep. 4, 2003

Related U.S. Application Data

(63) Continuation-in-part of application No. 09/515,662, filed on Feb. 29, 2000, now Pat. No. 6,284,817, which is a continuation of application No. 08/797,259, filed on Feb. 7, 1997, now abandoned.

(51) Int. Cl.[7] .......................... C09J 183/04; H01B 1/22; C08L 83/04

(52) U.S. Cl. ...................... 156/329; 252/500; 252/512; 252/514; 252/518.1; 252/519.31; 252/519.5; 252/519.51; 252/519.54; 252/520.2; 252/520.21; 252/520.3; 252/521.1; 252/521.3; 523/220; 524/430; 524/431; 524/432; 524/433; 524/434; 524/436; 524/437; 524/492; 524/493; 524/588

(58) Field of Search ........................ 156/329; 252/500, 252/512, 514, 518.1, 519.31, 519.5, 519.51, 519.54, 520.2, 520.21, 520.3, 521.1, 521.3; 523/220; 524/430, 431, 432, 433, 434, 436, 437, 492, 493, 588, 789, 779, 783, 785, 786, 847, 860

(56) References Cited

U.S. PATENT DOCUMENTS 5,569,684 A * 10/1996 Okami et al. ................ 523/209
6,124,483 A    9/2000 Fan et al. .................... 549/531
6,534,581 B1 *  3/2003 Kleyer et al. ................ 524/379

FOREIGN PATENT DOCUMENTS

| DE | 44 945 A | 12/1966 | |
| JP | 07-292251 | 11/1995 | ............ C08K/3/22 |
| WO | WO 02/28849 A1 | 11/2002 | ......... C07D/303/12 |

* cited by examiner

*Primary Examiner*—Jeffrey B. Robertson
(74) *Attorney, Agent, or Firm*—Steven C. Bauman

(57) ABSTRACT

The present invention relates generally to conductive, silicone-based compositions, with improved initial adhesion and reduced micro-voiding. More specifically, the present invention relates to a conductive, silicone-based composition, which includes a polyorganosiloxane, a silicone resin, and a conductive filler component.

15 Claims, 2 Drawing Sheets ns

CONDUCIVE, SILICONE-BASED COMPOSITIONS WITH IMPROVED INITIAL ADHESION REDUCED MICROVOIDING

This application is a 371 of International Patent Application No. PCT/US01/11728, filed Apr. 23, 2001 and a continuation-in-part of application Ser. No. 09/515,662, filed Feb. 29, 2000 (now U.S. Pat. No. 6,284,817, issued Sep. 4, 2001), which itself is a continuation of U.S. patent application Ser. No. 08/797,259, filed Feb. 7, 1997 (now abandoned).

BACKGROUND OF THE INVENTION

1. Field of the Invention

The present invention relates generally to conductive, silicone-based compositions, with improved intial adhesion and reduced micro-voiding.

2. Brief Description of Related Technology

Advances in the electronic industry have made thermal management an increasingly important consideration, particularly with respect to packaging issues. For instance, heat build-up in electronic products leads to reduced reliability ("mean-time-to-failure"), slower performance, and reduced power-handling capabilities. In addition, continued interest in increasing the number of electronic components on, while reducing the size of, semiconductor chips, notwithstanding the desire generally to reduce power consumption thereof, also contributes to the importance of thermal management. Also, chip-on-board technology, where semiconductor chips are mounted directly to printed circuit boards, creates further demands on thermal management because of the more efficient use of surface area thereon. Thus, it is not surprising that packaging technology has been called one of the greatest single factors limiting the electronics industry. See M. M. Konarski and J. Heaton, "Electronic Packaging Design Advances Miniaturization", *Circ. Assembly*, 32–35 (August 1996).

A heat sink, constructed from a lightweight thermally conductive material, such as aluminum alloy or graphite composite, is often used with electronic devices to facilitate heat dissipation therefrom.

Interfacial thermal resistance between the heat sink and the heat-generating electronic device has however presented obstacles in effeciently dissipating heat as intended. Generally, such resistance may be minimized by positioning at the interface junction a material having (1) high thermal conductivity, (2) intimate surface contact with the heat sink and electronic device, and (3) good durability, such as is measured by thermal cycling which detects failure or performance loss at the interface junction between the heat sink and the heat-generating device. Thermally conductive greases, mica chips and ceramic insulators, pads and tapes, and adhesives have been used as such interface materials.

Surface contact between the heat sink and the electronic device may be improved using a variety of materials, such as a thermal grease (which penetrates such interfacial or surface voids, thereby effectively lowering interfacial thermal resistance), mica chips (while inexpensive with excellent dielectric strength; they are brittle and easily damaged), thermally conductive pads [laminated composite materials, which are often coated with pressure-sensitive adhesives to facilitate bonding and good thermal contact with the substrate surfaces between which they are positioned, see e.g., U.S. Pat. No. 4,574,879 (DeGree)], and thermally conductive adhesives (which are curable), as contrasted to greases (which are not intended to be curable).

Various thermally conductive adhesives (such as those based on silicone, epoxy, phenolic, vinyl, and/or acrylic materials) are known for use in a number of applications, such as sealants, fuser roll coatings in electrostatic copying machines, bonding media, and the like.

Thermal conductivity improvments of such adhesives are desirable, and may often be attained by the addition of a conductive filler to the resin matrix. [See *Handbook of Fillers for Plastics*, 6.1, 255, H. S. Katz and J. V. Milewski, eds., Van Nostrand Reinhold Co., New York (1987); see also U.S. Pat. No. 4,147,669 (Shaheen) (gallium, aluminum, and gold, copper or silver in a resin); U.S. Pat. No. 4,544,696 (Streusand), U.S. Pat. No. 4,584,336 (Pate) and U.S. Pat. No. 4,588,768 (Streusand) (silicon nitride-containing organopolysiloxane with aluminum oxide or zinc oxide); U.S. Pat. No. 5,011,870 (Peterson) (aluminum nitride, and silicon metal and boron nitride in a polyorganosilicone resin matrix); and U.S. Pat. No. 5,352,731 (Nakano) (aluminum oxide-containing silicone rubber).]

U.S. Pat. No. 5,430,085 (Acevedo) describes a thermally and electrically conductive caulk including a resin, such as silicone, mixed with a filler which includes 80% by weight conductive particles with a particle size in the range of 300 to 325 microns, 10% by weight conductive particles with a particle size in the range of 75 to 80 microns, and 10% by weight conductive fibers having a length in the range of 0.020 to 0.025 inches.

U.S. Pat. No. 4,604,424 (Cole) describes thermally conductive silicone elastomers containing a polydiorganosiloxane, a curing agent, a platinum-containing hydrosilation catalyst, and zinc oxide and magnesium oxide fillers, the particle size of which fillers is such that substantially all of the filler particles pass through a 325 mesh screen, and the average particle size of which fillers is below 10 microns. The filler is composed of 50% to 90% zinc oxide, and 10% to 50% magnesium oxide, each by weight of the filler. Other fillers (up to 40% by weight) include aluminum oxide, ferric oxide and carbon black. The cured elastomers are said to resist erosion by abrasive materials to a greater extent than compositions containing aluminum oxide as the sole filler.

U.S. Pat. No. 4,444,944 (Matsushita) speaks to thermally conductive silicone rubber composition of 100 parts by weight of a polyorganosiloxane having a viscosity at 25° C. of from 0.1 to 100 Pa·s and having a certain average unit formula, a polyorganohydrogensiloxane having a viscosity at 25° C. of 0.0007 to 5 Pa·s and having a certain average unit formula, from 100 to 500 parts by weight of alumina powder having an average particle size of 2 microns to 10 microns and an oil absorption of $\geq 15$ mL/g, and a platinum catalyst.

In U.S. Pat. No. 5,445,308 (Nelson), another method of improving thermal conductivity provides a connection between spaced surfaces by mixing a thermally conductive filler containing a liquid metal (e.g., gallium, gallium/indium, gallium/indium/tin and/or mercury) into an unhardened matrix material (e.g., thermoplasts, thermosets, UV-curable materials, epoxies and solvent-bearing materials) and thereafter hardening the matrix material.

An English-language abstract of Japanese Patent Document JP 07-292251 appears to relate to curable thermally conductive electrically insulating magnesium oxide-containing silicone compositions.

International Patent Application No. PCT/US98/02531 provides a conductive, resin-based composition, which includes a resinous material, and a conductive filler. The conductive filler includes a first conductive filler and a second conductive filler. The particles of the first conductive filler are harder than those of the second conductive filler, when measured using the Mohs hardness scale. The composition is subjected to shear mixing forces which shearingly disperse the first and second conductive fillers throughout the resinous material in such a way that the particles of the second conductive filler occupy the interstitial voids within the network of first conductive filler particles contained in the resinous material and thereby enhance conductivity.

Silicone products of the type noted above (sometimes referred to as "MQ" resins) have been used to impart reinforcement properties to cured elastomers of heat-curable silicone compositions without increasing the viscosity of the composition, and while maintaining the clarity of the composition. MQ resins generally are copolymers of siloxanes formed from reactive trialkylsilyl ("M") and tetraalkoxy silicate ("Q") structures that can be prepared by either cohydrolyzing silanes containing M and Q units or by silylating inorganic silicates with trialkylsilyl containing silanes.

Vinyl- or hydride-containing silanes have been added during MQ resin preparation to yield MQ resins suitable for use in heat-cure silicone compositions. During heat cure, the vinyl groups on the MQ resin and the silicone fluid polymerize in a crosslinked network with the MQ resin incorporated in the network for reinforcement.

To date, commercially available thermally conductive compositions have suffered from a tendency to form crack-like voids in thin bonding applications, such as those common in the electronics industry—e.g., an electronic device (such as a silicon die) bonded to a heat sink (such as an aluminum heat sink). These crack-like voids (or microvoids) are thought to be caused by one or more of gas evaluation and/or shrinkage during cure, the cure temperature chosen, the type of conductive filler chosen, the nature, porosity and/or cleanliness of the substrate. In addition, commercially available silicone-based compositions have provided initial adhesion strength that could stand to be improved.

There, therefore, is an unfulfilled need for conductive, silicone-based compositions having superior conductivity characteristics without compromising the integrity of the mechanical properties of a cured reaction product, and more specifically demonstarting improved initial adhesion and reduced microvoiding.

SUMMARY OF THE INVENTION

The present invention provides a silicone-based composition exhibiting desirable conductive and physical properties, thereby meeting the need addressed above.

More specifically, the present invention relates to a conductive, silicone-based composition, which includes a polyorganosiloxane component, a silicone resin component, and a conductive filler component. The polyorganosiloxane and silicone resin are each chosen so that they are reactive with one another. The conductive filler component includes a first conductive filler and a second conductive filler.

In another aspect of the invention, there is provided a method of preparing a conductive, resin-based composition including a polyorganosiloxane component, a silicone resin component and a conductive filler component.

In yet another aspect of the invention there is provided reaction products of a curable conductive composition, which composition includes a polyorganosiloxane component, a silicone resin component and a conductive filler component. The composition may be cured to form the reaction products by heat, moisture, photoirradiation, and combinations thereof.

The present invention differs from known conductive, silicone-based compositions having fillers of different particle sizes at least in part by using a silicone resin for reinforcement purposes. The presence of the silicone resin imparts to cured products formed therefrom improved resistence to microvoiding and improved initial adhesion.

Other aspects and features of the invention will be more readily apparent from the ensuing disclosure, figures and claims.

DETAILED DESCRIPTION OF THE INVENTION

Figure 1:
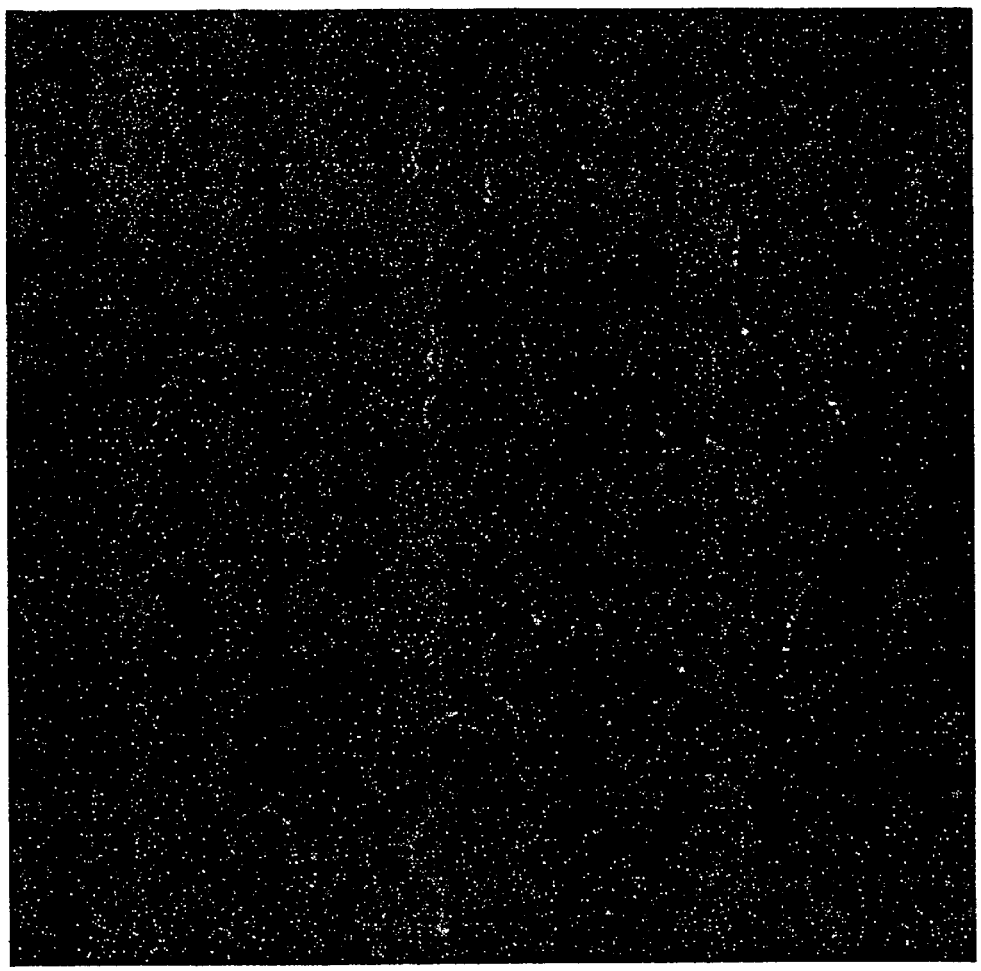
FIG. 1 depicts a photomicrograph of a known silicone-based composition with a conductive filler component (Sample No. 10), in which microvoids may be observed.

The present invention provides a silicone-based composition demonstrating desirable conductive and physical properties, such as improved resistance to microvoiding and improved initial adhesion.

More specifically, the present invention relates to a conductive composition, which includes a polyorganosiloxane, a silicone resin, and a conductive filler dispersed therein.

The polyorganosiloxane should have an average linear molecular size of at least about 100 siloxane units, with reactive groups such as ethylenically unsaturated radicals, (meth)acrylate, (meth)acryloxyalkyldialkoxysilyl and/or (meth)acryloxyalkyldiaryloxysilyl groups functionalizing the polyorganosiloxane.

For instance, the polyorganosiloxane may be selected from compounds within formula below:

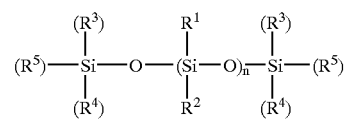

where $R^1$, $R^2$, $R^3$, $R^4$ and $R^5$ may be the same or different and are hydrogen, alkyl, alkenyl, aryl, alkoxy, alkenyloxy, aryloxy and the like, provided that at least two of $R^1$, $R^2$, $R^3$, $R^4$ and $R^5$ are a reactive functionality selected from alkenyl, alkoxy, alkenoxy and the like, having up to 12 carbon atoms ($C_{1-12}$), or substituted versions thereof, such as halo- or cyano-substituted; and n is an integer between about 100 and 1,200.

Generally, it is convenient to use a linear polyorganosiloxane having vinyl groups as $R^5$ terminating the silicone. Such vinyl-terminated silicones may be represented by the formula II below:

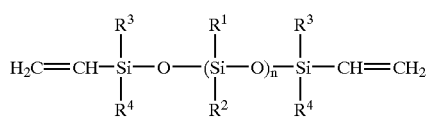

where $R^1$ $R^2$, $R^3$ and $R^4$ are alkyl, such as methyl and n is between 100 and 1,200.

Generally, the silicone resins are a family of silicone-based materials with a structure represented generally by $(R_3SiO^{1/2})_w(R_2SiO_{2/2})_x(RSiO_{3/2})_y(SiO_{4/2})_z$, where a portion of the total R content includes reactive functionality, such as vinyl, alkoxy and combinations thereof.

The silicone resin is formed from the hydrolysis and condensation product of at least one silane within the formula $R^1_m R^2_p Si(X)_{4-(m+p)}$ III, where $R^1$ and $R^2$ may be the same or different and may be selected from $C_{1-12}$ alkoxy, $C_{6-12}$ aryloxy, hydrogen, $C_{1-12}$ alkyl, $C_{2-12}$ alkenyl, $C_{2-12}$ alkenoxy, $C_{6-12}$ aryl, $C_{7-18}$ arylalkyl, $C_{7-18}$ alkylaryl, X is a hydrolyzable functionality, m is an integer from 1 to 3, and m+p is an integer from 1 to 3, and at least one other silane within the formula $R_n Si(X)_{4-n}$ IV, where R individually may be the same or different and may be selected from hydrogen, $C_{1-12}$ alkyl, $C_{6-12}$ aryl, $C_{7-18}$ arylalkyl, $C_{7-18}$ alkylaryl, haloalkyl, and haloaryl, X is a hydrolyzable functionality, and n is an integer of from 0 to 3.

The hydrolyzable functionality in the silanes may be any functionality which, when attached to a silicon atom through a Si—O, Si-halo, Si—N or Si—S bond, is readily hydrolyzable in the presence of water. Examples of such functionality include, but are not limited to, halogen, (meth)acryloxy, alkoxy, aryloxy, isocyanato, amino, acetoxy, oximinoxy, aminoxy, amidato and alkenyloxy.

R may be chosen from alkyl, aryl, alkenyl, and (meth)acryloxy. In such instances, when R is alkyl or aryl, examples of the first silane include, but are not limited to, (meth)acryloxypropyl trimethoxysilane, (meth)acryloxypropyl trichlorosilane, (meth)acryloxypropyl dimethylchlorosilane, (meth)acryloxymethyl dichlorosilane and (meth)acryloxymethyldimethyl acryloxysilane.

When $R^1$ on the other silane is chosen from alkyl or aryl, the other silane itself may be dimethylchlorosilane, phenyltrichlorosilane, tetrachlorosilane, trimethylchlorosilane, trimethylmethoxysilane, dimethyldimethoxysilane, phenyltrimethoxysilane and tetraethoxysilane.

Desirably, the reactive functionality on the polyorganosiloxane and that on the silicone resin should be chosen appropriately to ensure that these components may react with one another to form a crosslinked matrix. More specifically, where the polyorganosiloxanes is vinyl functionalized so too should the silicone resin. In addition, combinations of reactive functionality may be present on either or both of the polyorganosiloxane component and the silicone resin component, provided that at least one functional group on the polyorganosiloxane component is reactive with at least one functional group on the silicone resin component. The total reactive functional group content on the polyorganosiloxane component may be in the range of about 0.01 mole % to about 0.5 mole %, such as about 0.03 mole % to about 0.2 mole %. The total reactive functional group content on the silicone resin may be up to about 15 mole %, such as in the range of about 1 mole % to about 10 mole %, for instance about 4 mole % to about 8 mole %.

These silicone resins may also be prepared by (1) acidifying water-soluble sodium silicate, and thereafter capping the resulting sol with a trialkylsilyl group as well as with (meth)acrylate-containing silane or (2) co-hydrolyzing and/or co-condensing silanes containing trialkylsilane groups, WO 02/086911 PCT/US01/11728 vinyl silane groups and tetraalkoxysilane. For a further discussion of silicone resins generally, see R. H. Blaney et al., "Silsesquioxanes", *Chem. Rev.*, 95, 1409–30 (1995).

In the reaction forming such silicone resins, a first silane should be used in an amount within the range of from about 1 to about 10 mole %, such as from about 3 to about 8 mole % of the combination of the first and second silanes. The other silane(s) should be used in an amount with the range of from about 90 to about 99 mole %, such as from about 92 to about 97 mole % of the combination of the first and the other silanes.

Of course, appropriate combinations of the first silane may be used as the first silane component; likewise appropriate combinations of the other silane(s) may be used as the other silane component.

Certain of the silicone resins are commercially avialable, such as one known as VMQ-800 (a MQ resin in vinyl-terminated polydimethylsiloxane, Hanse Chemie, Germany).

Desirable examples of silicone resins include MQV-4 (a vinyl-functionalized MQ resin in solvent), PCR, Gainesville, Fla., and MQ silicone resin 8 mole % vinyl, 50% in toluene, McGhan Nusil, Carpinteria, Calif.

Addition of the silicone resin is seen to reduce the microvoiding oftentimes observed in reaction products of known compositions, as is demonstrated below in the examples and with reference to the drawings.

The reduction in microvoiding is an important parameter as it is useful in determining how well the microelectronic devices with which the silicone composition is to be used will perform over time, with respect to adhesion strength, device reliability and thermal conductivity.

Initial adhesion strength is seen to be an important physical property, as it tends to increase the reliability of the component with which the composition is intended to be used. In addition, initial adhesion improvements may also increase manufacturing throughput, which may otherwise be delayed as the adhesion of the composition develops over time. Accordingly, many known silicone-based composed exhibit an initial adhesion strength that could stand improvement.

The conductive filler includes a first conductive filler and a second conductive filler. The particles of the first conductive filler are harder than those of the second conductive filler when measured using the Mohs hardness scale. The conductive filler includes at least a first conductive filler component (such as an inorganic or metallic material) and a second conductive filler (such as an inorganic or metallic material, which preferably is different from the one chosen as the first conductive filler).

Conductivity of such a silicone-based composition is seen to be substantially increased by including therein a conductive filler, with the increase being synergistic based on the combination of two or more conductive filler components, each of which having different hardness values as measured on the Mohs hardness scale, and with the softer of the conductive filler components filling the interstitial voids formed between the harder conductive filler component(s) so as to increase the conductivity of the composition.

Though it is advantageous to use a bicomponent conductive filler mixture, such as a first conductive filler which is harder (as measured by conventional hardness tests, such as Mohs hardness) in relation to the second conductive filler, it is within the spirit and scope of the present invention for additional conductive fillers to be used together with the first and second conductive fillers. And, of course, the conductive fillers themselves are thermally conductive.

As stated above, the first and second conductive fillers may be inorganic or metallic, and may include as appropriate choices iron, aluminum, zinc, silver, gold, lead, nickel, magnesium, boron, barium, platinum, palladium, copper, zirconium, titanium, uranium, vanadium, niobium, tungsten, silicon and conductive derivatives thereof, such as oxides and nitrides, as well as carbon, graphite, silicon carbide, and the like, and combinations thereof.

The skilled artisan will recognize that various combinations of metals, metal oxides and/or metal nitrides are contemplated within the scope of the invention. For instance, aluminum nitride (such as is commercially available from Advanced Refactory Technologies, Inc., Buffalo, N.Y. or Keramont Corporation, Tucson, Ariz.), magnesium oxide (such as is commercially available from Kaopolite Incorporated, Union, N.J. or Harbison-Walker Refractories Company, Pittsburgh, Pa.), and aluminum oxide (such as is available commercially from Whittaker, Clark & Daniels, Inc., South Plainfield, N.J.) are desirable choices for the first conductive filler component, with aluminum oxide being particularly desirable. Zinc oxide (such as is available commercially from Zinc Corporation of America, Monaca, Pa.) is a particularly desirable choice for the second conductive filler component.

As noted, the particles of the first conductive filler are harder than those of the second conductive filler, when measured using conventional hardness tests such as the Mohs hardness scale. The differences in relative hardnesses between the first and second conductive fillers is seen to provide a means by which size reduction of the softer of the components may be facilitated. That is, during formulation of the composition, conductive fillers are mixed in a resinous material during which mixing the harder of the conductive fillers acts to comminute the softer of the conductive fillers. The comminuted softer conductive fillers may then fill the interstitial voids created within the network or matrix of harder conductive fillers. The degree of difference of relative hardnesses is not critical, provided that the first conductive fillers is harder than the second conductive fillers, such as when measured using a Mohs hardness test. Of course, the greater is the difference in relative hardness between the first and second conductive fillers, the greater is the degree of comminution of second conductive fillers particles, all else being equal.

In conductive, silicone-based compositions according to the present invention, the first and second conductive fillers are thermally conductive and may also possess desirable electrical properties, such as electrical conductivity. The conductivity, particularly thermal conductivity, of filled, silicone-based compositions depends at least in part on the concentration or loading level (or volume fraction) of the conductive filler in the composition. Of course, conductivity also depends on the inherent properties of the conductive filler, as well as the spatial arrangement of conductive filler particles within the polyorganosiloxane/silicone resin matrix.

More specifically, the conductivity, volume fraction and dispersion of the conductive filler in the resin matrix aid in determining the degree of observed improvement in thermal conductivity. Further improvement may also be achieved by enhancing filler contact throughout the resin matrix. That is, the particle size, geometry and relative dispersion and spatial arrangement of the conductive filler within the resin matrix also aid in determining the degree of thermal conductivity of the filler-containing resin. See supra *Handbook of Fillers for Plastics*. In this regard, it may be advantageous to enhance the density of filler packing within the resin matrix by blending particles of different sizes so as to further enhance the filling of voids therebetween. It is generally desirable that the thermal conductivity of conductive filler-containing compositions (and cured materials formed therefrom) be as high as possible in the chosen end use applications of such materials.

In order to increase thermal conductivity, the amount of conductive filler in the composition should desirably be increased. The addition of conductive filler to resin also increases the viscosity thereof, up to a maximum filler loading which permits dispensing of the material. Generally, higher concentrations of a conductive filler should result in greater conductivity, all else being equal. However, the addition of too much conductive filler may compromise the Theological properties of the composition [yielding significantly increased viscosity (thereby decreasing the flowability and dispensability of the composition)] and the mechanical integrity and adhesive/cohesive properties of the end use cured product (due to high susceptibility to cracking, reduced bonding properties and problems with manufacture) because of insufficient resin concentration. And nonhomogeneity may also result (due to settle-out of the thermally conductive filler from the associated resin). An appropriate balance therefore should be reached between conductivity—e.g., thermal—and polyorganosiloxane silicone/resin matrix properties, and the specific application with which the filled, silicone-based composition is desirably used.

A representative conductive filler may include a first conductive filler in an amount within the range of from about 65% to about 95% by weight of the conductive filler, and a second conductive filler in an amount within the range of from about 5% to about 35% by weight of the conductive filler, with the weight percentages of the first and second conductive fillers totaling 100%.

As the mode of curing, heat cure, photoinitiated cure (e.g., visible or ultraviolet light) and/or moisture cure, for the polyorganosiloxane and silicone resins, are appropriate choices, with heat cure being particularly desirable.

In order to catalyze the cure mechanism, an appropriate catalyst system should be included in the inventive compositions. For instance, as regards a heat cure mechanism, appropriate catalyst systems include organo-metallic hydrosilation catalysts, such as those selected from precious metal or precious metal-containing catalysts effective to initiate a thermal hydrosilation cure reaction. For instance, platinum- and rhodium-based catalysts, which are effective for catalyzing the addition reaction between silicone-bonded hydrogen atoms and silicone-bonded olefinic groups, are well suited for use herein. Examples of platinum-based catalysts include platinum metal on charcoal, the platinum hydrocarbon complexes described in U.S. Pat. Nos. 3,159,601 and 3,159,662, the platinum alcoholate catalysts described in U.S. Pat. No. 3,220,970, the platinum complexes described in U.S. Pat. No. 3,814,730 and the platinum chloride-olefin complexes described in U.S. Pat. No. 3,516,946. Each of these patents relating to platinum-based catalysts are hereby expressly incorporated herein by reference.

Catalysts based on ruthenium, paladium, osmium and iridium are also contemplated. Organoplatinum catalysts are particularly useful herein. Of the non-platinum based catalysts useful, those based on rhodium are particularly desirable. The organometallic hydrosilation catalysts may be used in any effective amount to effectuate thermal curing. Desirably, the catalyst is present in amounts of about 0.025% to about 1.0% by weight. Combinations of various precious metal or precious metal-containing catalysts are contemplated.

As regards a photointiated cure mechanism, the photoinitiator component may be any photoinitiator known in the art to cure acrylic functionalities, including benzoin and substituted benzoins (such as alkyl ester substituted benzoins), benzophenone, Michler's ketone, dialkoxyacetophenones, such as diethoxyacetophenone, benzophenone and substituted benzophenones, acetophenone and substituted acetophenones, and xanthone and substituted xanthones. Desirable photoinitiators include diethoxyacetophenone, benzoin methyl ether, benzoin ethyl ether, benzoin isopropyl ether, diethoxyxanthone, chloro-thioxanthone, azo-bisisobutyronitrile, N-methyl diethanolaminebenzophenone, and mixtures thereof. Visible light initiators include camphoquinone peroxyester initiators and non-fluorene-carboxylic acid peroxyesters.

Particularly desirable photoinitiators include diethoxyacetophenone ("DEAP"). Generally, the amount of photoinitiator should be in the range of about 0.1% to about 10% by weight, such as about 2% to about 6% by weight. The photoinitiator may also be polymer bound. Such photoinitiators are described in U.S. Pat. Nos. 4,477,326 and 4,587,276, the disclosures of each of which are hereby incorporated herein by reference. Other free radical initiators, such as peroxy initiators, may be used.

As regards a moisture cure catalyst, such catalysts include organic compounds of titanium, tin, zirconium, aluminum and of course combinations thereof. Tetraisopropoxytitanate and tetrabutoxytitanate are particularly desirable. See also U.S. Pat. No. 4,111,890, the disclosure of which is expressly incorporated herein by reference.

In those compositions in which moisture cure capabilities are also present, a moisture cure catalyst should also be included in an amount effective to cure the composition. For example, from about 0.1 to about 5% by weight, such as about 0.25 to about 2.5% by weight, of the moisture cure catalyst is desirable.

Of course, dual cure silicone systems are contemplated within the scope of the invention as well. See U.S. Pat. No. 4,528,081 (Nakos) and U.S. Pat. No. 4,699,802 (Nakos), the disclosure of each of which are hereby incorporated herein by reference, for UV/moisture dual curing silicone compositions.

The silicone-based compositions of the present invention may be prepared by introducing the respective conductive filler components to the resinous material, followed by a shear mixing addition thereto of the conductive fillers chosen. As used in this context, shear mixing refers to the application of mechanical shear action to the mixture of the resinous material and conductive filler, such as for example from an impeller, blade or paddle-type mixing apparatus.

The choice of mixing conditions, including shear levels, tip speeds of impeller blades, mixing duration, and the like may be readily determined by those persons skilled in the art for the particular composition under examination using routine, rather than undue, experimentation. The result of such size reduction is a substantially uniform, densely packed filler in the conductive, resin-based composition and in the case of a curable composition the final cured reaction product thereof.

In preparing conductive, silicone-based compositions according to the present invention, the mixture of the polyorganosiloxane, silicone resin and conductive filler components are subjected to shear mixing forces so that the second conductive filler of the conductive filler component is shearingly contacted with the first conductive filler component so as to-become reduced in size, and may be twisted and compressed in geometric shape, and dispersed throughout the resin matrix. Such shearing dispersion allows for the milled second conductive filler component to fill the interstitial voids formed in the matrix of the first conductive filler component and create essentially continuous contact and conductive continuity throughout the resin matrix. In this manner, enhanced conductivity throughout the conductive, silicone-based composition may be achieved.

With conductive, silicone-based compositions in accordance with the present invention, after subjection to shear mixing forces, the particle size of the first conductive filler should be greater than 10 microns, such as in the range of from about 12 to about 18 microns and the particle size of the second conductive filler may be in the range of from about 1 to about 10 microns, with about 3 to 7 microns being desirable. Of course, prior to subjection to such shear mixing forces, the second conductive filler particles may be substantially the same size or even greater in size than the first conductive filler particles. Desirably, however, the average particle size of the second conductive filler may be about 5 microns, and the average particle size of the first conductive filler may be about 12 to about 14 microns.

It may be desirable for the relative particle sizes of the first and second conductive fillers to be such that the harder particles (i.e., the first conductive filler component) are from about 1 to about 10 times the size of the softer particles (i.e., the second conductive filler component), with the size of the second conductive filler particles being for example between about 10 and about 40 microns. It may be desirable for the harder particles to be between about 1.75 and about 5 times the size of the softer particles, with a particularly advantageous size of the harder particles being from about 2 to about 3 times that of the softer particles.

After subjetion to shear mixing, the first and second conductive fillers may be densely packed in a substantially uniform manner within the resin matrix of the conductive composition. The composition should be formulated, for example, so that the packing of the first and second conductive fillers is denser than that of either the first or second conductive fillers alone, at otherwise equal weight percent concentration in the conductive, silicone-based composition. Thue, where the first conductive fillers is aluminum oxide, whose specific gravity is 3.98 grams/cc, and the second conductive filler component is zinc oxide, whose specific gravity is 5.6 grams/cc, the volume occupied by aluminum oxide is 1/3.98 (or 0.25) cc/grams and the volume occupied by zinc oxide is 1/5.6 (or 0.18) cc/gram. And when combined as the conductive filler in a by weight ratio of, for instance, about 1:4, the conductivity of the first and second conductive fillers in similar volume is greater than the conductivity of either of those fillers individually. Indeed, the enhanced packing of fillers observed in the composition is seen to result in increased or improved thermal conductivity.

The conductive filler axvantageously is present in an amount from about 25% to about 95% by weight of the total weight of the conductive, silicone-based composition. For instance, the conductive, silicone-based composition may be formulated so that the first conductive filler component includes aluminum oxide particles at a concentration of from about 50% to about 75% by weight of the silicone-based conductive composition, and the second conductive filler includes zinc oxide particles at a concentration of from about 5% to about 50% by weight of the silicone-based conductive composition.

The silicone-based conductive composition of the present invention may contain, in addition to the polyorganosiloxane, silicone resin and thermally conductive filler, other suitable components, including adhesion promoters, inhibitors, stabilizers, anti-oxidants, non-conductive filler (where reinforcement of the composition or suspension of component particles is desirable), surfactants dispersing agents, colorants, and the like. Of course, appropriate polymerization catalystys, such as described above, shoulde be included. Appropriate choice and amounts of such components may be made by those persons having skill in the art without undue experimentation.

A particular conductive composition in accordance with the present invention includes a curable poluorganosiloxane and a curable silicone resin, throughout which is dispersed a thermally conductive filler, such as one including from about 65% to about 95% by volume of aluminum oxide particles and from about 5% to about 35% by volume of zinc oxide particles, based on the total volume of the thermally conductive filler.

Composition in accordance with the present invention may be cured through controlled temperature (i.e., at temperature ranging from ambient to about 200° C.), air or moisture conditions, or exposure free radicals. Of course, depending on the type of cure mechanism desired, appropriate additives may be included in the composition to initiate or enhance the rate of cure, such as, for instance, heat and/or moisture cure promoters as are well-known in the art or various free radical propagators which are also known to enhance the rate of cure in heat and/or radiation cure systems.

The following examples are provided to illustrate certain features and aspects of the presents invention, and are in no way to be construed as limiting the full scope of the teaching described herein.

EXAMPLES

1. Formulation of Thermally Conductive Silicone Elastomer Compositions

Thermally conductive composition in accordance with the present invention were prepared using as a polyorganosiloxane component the combination of vinyldimethyl terminated dimethyl silicone and trimethyl terminated methylhydrogen dimethyl silicone co-polymer, each of which is commercially available from Mazer Chemical, Chicago, Ill., a division of PPG Industries, Pittsburgh, Pa.

As the silicone resin, VMQ-800 was used.

As the conductive filler component a combination of two conductive fillers selected from calcined 325 mesh aluminum oxide (commercially available from Whittaker, Clark & Daniels), fumed aluminum oxide (commercially available from Advance Refractories) and 325 mesh zinc oxide (commercially available from Zinc Corporation of America under the trade designation "KADOX" 930) was used.

In addition, an adhesion promoter to aid in adhesion to the surface of a substrate on which it is applied, such as 3-glycidoxypropyltrimethoxy silane (commercially available from OSI Specialties, Sisterville, W. Va.), and a platinum complex catalyst solution (such as BAYSILONE U catalyst PtL, commercially available from Bayer Corporation, Pittsburgh, Pa.) were used in formulating the compositions.

Each composition was formulated using a Jaygo Model MPVDV-10 double planetary kneader-mixer with a central disperser set on low speed (500 rpm) for the planetary and set on high speed (5000 rpm) for the disperser portion of the apparatus. The temperature of the kettle of the apparatus was maintained at about 150° C. in order to aid in dispersing and wetting the filler, a vacuum of about 1 mm Hg was drawn on the kettle.

The silicone materials were added to the kettle with mixing, followed by about one-half of the aluminum oxide. Mixing was continued at low speed for a period of time of about 10 minutes to wet the aluminum oxide so as to minimize dust generation. The remaining portion of aluminum oxide was then added and mixing continued at low speed for a period of time of about 1 hour, with the kettle maintained at a temperature of about 150° C. under a reduced pressure of about 1 mm Hg.

Thereafter, about one-half of the zinc oxide was added to the aluminum oxide silicone resin mixture and mixing was allowed to continue for a period of time of about 10 minutes at high speed. The remaining portion of zinc oxide was then added and mixing continued at high speed for a period of time of about 3 hours, with the kettle maintained at a temperature of about 150° C. under a reduced pressure of about 1 mm Hg.

The mixture was then allowed to cool to room temperature, and the adhesion promoter in an amount of about 1% by weight and the platinum complex catalyst solution in an amount of about 0.88% by weight were added to the mixture. Mixing was then allowed to continue at low speed for a period of time of about 5 to 10 minutes under a reduced pressure of about 1 mm Hg. Thereafter, the composition was packaged in 300 ml cartridges using conventional packaging techniques.

Sample Nos. 1–10 are presented below in Tables 1(a) and 1(b), together with their components and respective amounts.

TABLE 1(a)

| Component | | Sample No./Amt (wt %) | | | | |
|---|---|---|---|---|---|---|
| Type | Identity | 1 | 2 | 3 | 4 | 5 |
| Polyorgano-siloxane | Vinyl-terminated PDMS | — | 12.42 | 20.30 | 7.39 | 23.20 |
| | H-terminated PDMS | 4.04 | — | — | 12.88 | — |
| Silicone resin | Vinyl-functionalized MQ resin | 16.27 | 7.89 | — | — | — |
| Conductive filler | Alumina Calcined | 58.48 | 58.48 | 58.49 | 66.85 | 58.49 |
| | Fumed | — | — | — | — | 6.60 |
| | Zinc Oxide | 17.44 | 17.44 | 17.45 | 17.42 | — |
| Addition cure catalyst | BAYSILONE U Catalyst P + L | 0.05 | 0.05 | 0.05 | 0.05 | 0.06 |
| Adhesion promoter | Alkoxy silane | 1 | 1 | 1 | 1.15 | 0.57 |

TABLE 1(b)

| Component | | Sample No./Amt (wt %) | | | | |
|---|---|---|---|---|---|---|
| Type | Identity | 6 | 7 | 8 | 9 | 10 |
| Polyorgano-siloxane | Vinyl-terminated PDMS | 20.32 | 20.32 | 16.87 | 13.19 | 16.87 |
| | H-terminated PDMS | — | — | 3.45 | — | — |
| | | — | — | — | — | 4.88 |
| Silicone resin | Vinyl-functionalized MQ resin | — | — | — | 8.75 | — |
| Conductive filler | Alumina Calcined | 58.49 | 58.49 | 58.49 | 58.49 | 58.49 |
| | Fumed | — | — | — | — | — |
| | Zinc Oxide | 17.45 | 17.45 | 17.45 | 17.45 | 17.45 |

TABLE 1(b)-continued

| Component | | Sample No./Amt (wt %) | | | | |
|---|---|---|---|---|---|---|
| Type | Identity | 6 | 7 | 8 | 9 | 10 |
| Addition cure catalyst | BAYSILONE U Catalyst P + L | 0.05 | 0.05 | 0.05 | — | 0.05 |
| Adhesion promoter | Alkoxy silane | 0.97 | 0.97 | 0.47 | 0.48 | 0.97 |

2. Curing of Thermally Conductive Silicone Composition

The compositions were cured by dispensing an appropriate amount thereof onto a teflon mold of a Carver Heated Press to form a sheet of a thickness of about 0.320 cm. The dimensions of the mold are about 5"×5"×0.75", and the operational temperature of the mold was elevated to about 130° C. After a period of time of about 0.5 hours, a cured material in the form of a sheet having the dimensions of the mold was prepared.

3. Determination of Improved Initial Adhesion

Sample Nos. 1–10 were applied to two sets of aluminum lap shears, one set with a zero gap between the lap shears (Table 2(a)) and a second set with a 10 mil gap generated by spacers constructed of stainless steel wire (Table 2(b)). The compositions were cured for a period of time of about 1 hour at a temperature of about 150° C. The so cured compositions were evaluated for lap shear strength once the lap shears cooled to room temperature (Tables 2(a) and 2(b), first data row).

TABLE 2(a)

| Sample No./Initial Adhesion (psi)-0 gap | | | | | | | | | |
|---|---|---|---|---|---|---|---|---|---|
| 1 | 2 | 3 | 4 | 5 | 6 | 7 | 8 | 9 | 10 |
| 1005 | 863 | 583 | 664 | 206 | 119 | 611 | 622 | 713 | 395 |

TABLE 2(b)

| Sample No./Initial Adhesion (psi)-10 mil gap | | | | | | | | | |
|---|---|---|---|---|---|---|---|---|---|
| 1 | 2 | 3 | 4 | 5 | 6 | 7 | 8 | 9 | 10 |
| 986 | 675 | 509 | 583 | 269 | 173 | 340 | 472 | 715 | 313 |

As may be seen from reference to Tables 2(a) and 2(b), Sample Nos. 1, 2, and 9 (with silicone resin) cured to reaction products that demonstrated vastly superior initial adhesion than those samples having no silicone resin.

4. Determination of Reduced Microvoiding

Figure 2:
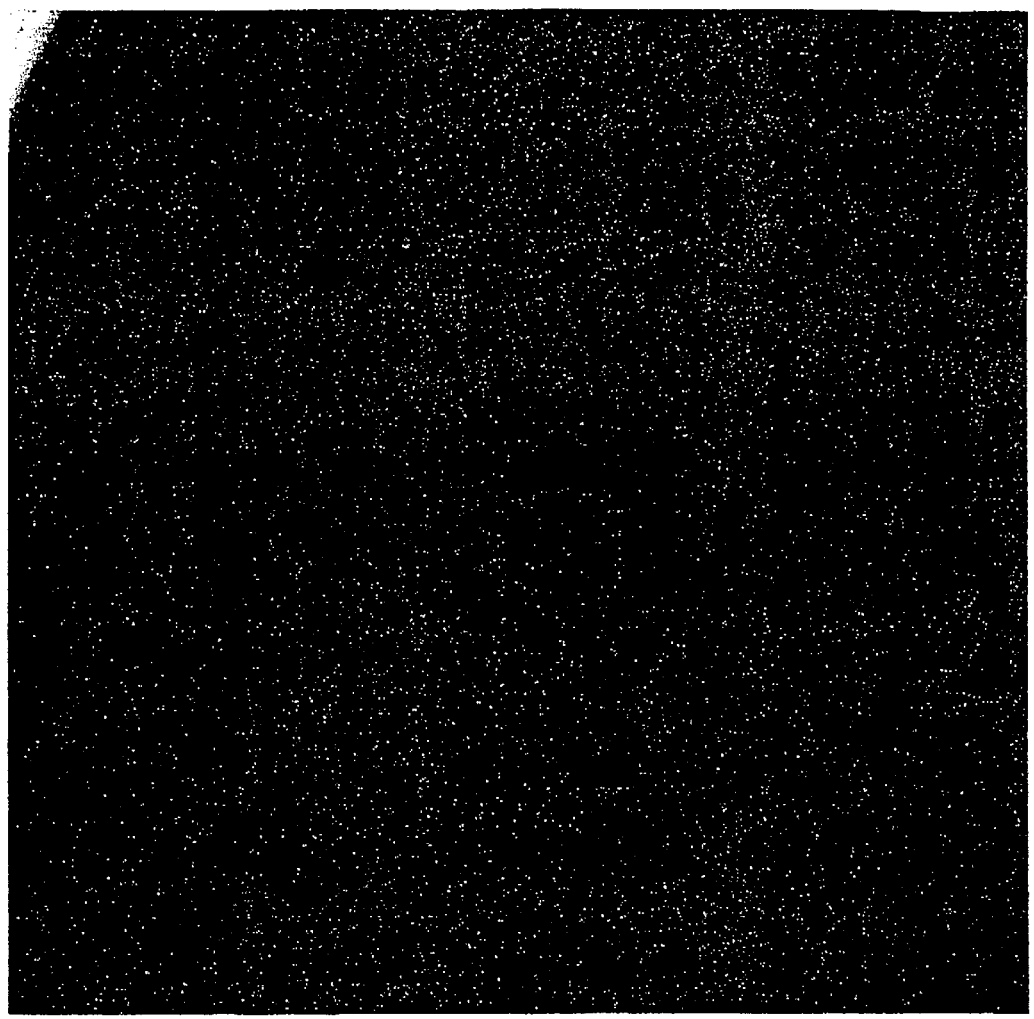
FIG. 2 depicts a photomicrograph of a silicone-based composition within the scope of the present invention (Sample No. 2), in which the amount of microvoiding is greatly reduced.

Reference to FIGS. 1 and 2 shows that cured reaction products formed from Sample No. 2 (a composition within the scope of the present invention) exhibits far less microvoiding than Sample No. 10 (a known silicone-based composition, provided for comparative purposes).

5. Determination of Thermal Conductivity

The thermal conductivity of cured compositions of the formulations described above was determined according to the Guarded Heat Flow Meter method, as described in ASTM F 433, "Standard Practice for Evaluating Thermal Conductivity of Gasket Materials", and measured at a temperature of about 100° C.

Each of the cured compositions was cut into a sample disk having a diameter of about 2 inches and a thickness of about one-eighth inch. The sample disk was then placed between an upper and a lower plate of a Holometrix Model TCA-300 instrument (Holometrix, Bedford, Mass.), with each plate being at a different temperature to produce a heat flow through the sample disk. For instance, the temperature of the upper plate and the temperature of the lower plate should be adjusted accordingly so that the sample disk obtains a desirable temperature, such as about 100° C. The Holometrix instrument correlates the temperature differences of the two plates with the heat flow therebetween, and calibrates the heat flow by comparison with standard materials of known thermal conductivity. In this case, the heat flow through the sample disk was measured with a heat flux transducer contained in the lower plate. The sample disk was maintained between the two plates, with a pressure of about 20 psi. Thermal conductivity was determined by dividing the sample thickness by the thermal resistance, which was measured as described above.

Thermal conductivity measurements for a composition in accordance with the present invention (i.e., Sample No. 2, which contains a reactive polyorganosiloxane, a silicone resin, and a conductive filler) and a comparative composition (i.e., Sample No. 8, which contains no silicone resin) are set forth below in Table 4.

TABLE 4

| Sample No. | Thermal Conductivity (W/m-K @ 100° C.) |
|---|---|
| 2 | 0.987 |
| 8 | 0.977 |

As may be seen from these measurements, the addition of the silicon resin does not detract from the ability of the cured composition to maintain thermal conductivity.

While the present invention has been exemplified above, it is clear that variations exist within the spirit and scope of the present invention which may be practiced in accordance hereof with only routine, rather than undue, experimentation. Any such variations and equivalents should provide at least suitable, if not comparable results, when viewed in connection with the results obtained from the above examples. Accordingly, such variations and equivalents are also intended to be encompassed by the claims.

What is claimed is:

1. A curable conductive composition of comprising:
   (a) a reactive polyorganosiloxane component;
   (b) a silicone resin formed as a hydrolysis and condensation product of at least one silane within the formula $R^1_m R^2_p Si(X)_{4-(m+p)}$, wherein $R^1$ and $R^2$ may be the same or different and may be selected from the group consisting of monovalent ethylenically unsaturated radicals, $C_{1-12}$ alkoxy, $C_{6-12}$ aryloxy, (meth)acrylate, hydrogen, $C_{1-12}$ alkyl, $C_{6-12}$ aryl, $C_{7-18}$ arylalkyl, and $C_{7-18}$ alkylaryl, X is a hydrolyzable functionality, m is an integer from 1 to 3, and m+p is an integer from 1 to 3 provided at least one of $R_1$ and $R_2$ is a member selected from the group consisting of monovalent ethylenlcally unsaturated radicals, $C_{1-12}$ alkoxy, $C_{6-12}$ aryloxy, (meth)acrylate hydrogen; and
   (c) a conductive filler component, wherein the composition demonstrates an improved initial adhesion to a substrate with which it is to be used of at least about 7%; and wherein the conductive filler component comprises:
      (i) a first conductive filler and
      (ii) a second conductive filler, wherein the first conductive filler is relatively harder than the second conductive filler using a Mohs hardness test, wherein the composition is subjected to shear mixing forces which shearingly disperse the first and second conductive fillers throughout the composition so as to provide a volume fraction of conductive filler throughout the resinous material in the range of about 30 to about 65% by volume of the composition.

2. The composition of claim 1, wherein the reactive polyorganosiloxane is within

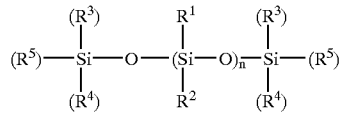

wherein $R^1$, $R^2$, $R^3$, $R^4$ and $R^5$ may be the same or different and are each independently selected from the group consisting of hydrogen, alkyl, alkenyl, aryl, alkoxy, alkenyloxy, and aryloxy, provided that at least two of $R^1$, $R^2$, $R^3$, $R^4$ and $R^5$ are each reactive functionality selected from the group consisting of alkenyl, alkoxy, and alkenoxy, having up to 12 carbon atoms, with or without substitution by halo- or cyano-groups; and n is an integer between about 100 and 1,200.

3. The composition of claim 1, wherein the silicone resin is formed as a reaction product of the at least one silane and at least one other silane within the formula, $R_nSi(X)_{4-n}$, wherein R may be the same or different and selected from the group consisting of hydrogen, $C_{1-12}$ alkyl, $C_{6-12}$ aryl, $C_{7-18}$ arylalkyl, $C_{7-18}$ alkylaryl, haloalkyl, and haloaryl, X is a hydrolyzable functionality, and n is an integer of from 0 to 3.

4. A curable conductive composition comprising:
(a) a reactive polyorganosiloxane component;
(b) a silicone resin formed as a hydrolysis and condensation product of at least one silane within the formula $R^1{}_mR^2{}_pSi(X)_{4-(m+p)}$, wherein $R^1$ and $R^2$ may be the same or different and may be selected from the group consisting of monovalent ethylenically unsaturated radicals, $C_{1-12}$ alkoxy, $C_{6-12}$ aryloxy, (meth) acrylate, hydrogen, $C_{1-12}$ alkyl, $C_{6-12}$ aryl, $C_{7-18}$ arylalkyl, and $C_{7-18}$ alkylaryl, X is a hydrolyzable functionality, m is an integer from 1 to 3, and m+p is an integer from 1 to 3 provided at least one of $R_1$ and $R_2$ is a member selected from the group consisting of monovalent ethylenically unsaturated radicals, $C_{1-12}$ alkoxy, $C_{6-12}$ aryloxy, (meth)acrylate hydrogen; and
(c) a conductive filler component, wherein the composition demonstrates an improved initial adhesion to a substrate with which it is to be used of at least about 7%; and wherein at least one of the polyorganosiloxane component and the silicone resin component is moisture curable.

5. The composition of claim 4, wherein the conductive filler component comprises the combination of at least two conductive fillers.

6. The composition according to claim 1, wherein the composition is thermally conductive.

7. The composition according to claim 1, wherein the composition is electrically conductive.

8. The composition according to claim 1, wherein at least one of the polyorganosiloxane component and the silicone resin component is heat curable.

9. The composition according to claim 1, wherein at least one of the polyorganosiloxane component and the silicone resin component is radical curable.

10. The composition according to claim 1, wherein the particle size of the first conductive filler is larger relative to the second conductive filler.

11. The composition according to claim 1, wherein the first and second conductive fillers are selected from at least one of the group consisting of iron, aluminum, zinc, silver, gold, lead, nickel, magnesium, boron, barium, platinum, palladium, copper, zirconium, titanium, uranium, vanadium, niobium, tungsten, silicon and derivatives and combinations thereof.

12. The composition according to claim 1, wherein the conductive filler component includes as the first conductive filler from about 75% to about 95% by weight aluminum oxide, based on the total weight of the conductive filler component, and as the second conductive filler from about 5% to about 25% by weight zinc oxide based on the total weight of the conductive filler.

13. The composition according to claim 1, wherein after subjection to shear mixing forces the first and the second conductive fillers are densely packed in a substantially uniform manner within the composition.

14. A process for preparing a conductive composition, said process comprising the steps of:
(a) providing a curable conductive composition comprising:
  (i) a reactive polyorganosiloxane component;
  (ii) a silicone resin formed as a hydrolysis and condensation product of at least one silane within the formula $R^1{}_mR^2{}_pSi(X)_{4-(m+p)}$, wherein $R^1$ and $R^2$ may be the same or different and may be selected from the group consisting of monovalent ethylenically unsaturated radicals, $C_{1-12}$ alkoxy, $C_{6-12}$ aryloxy, (meth) acrylate, hydrogen, $C_{1-12}$ alkyl, $C_{6-12}$ aryl, $C_{7-18}$ arylalkyl, and $C_{7-18}$ alkylaryl, X is a hydrolyzable functionality, m is an integer from 1 to 3, and m+p is an integer from 1 to 3 provided at least one of $R_1$ and $R_2$ is a member selected from the group consisting of monovalent ethylenically unsaturated radicals, $C_{1-12}$ alkoxy, $C_{6-12}$ aryloxy, (meth)acrylate hydrogen; and
  (iii) a conductive filler component, wherein the composition demonstrates an improved initial adhesion to a substrate with which it is to be used of at least about 7%, and
b) shearingly dispersing the components thereof by application of shear mixing forces to form a substantially homogeneous composition in which the conductive filler is densely packed in the composition.

15. A process for using a conductive composition to bond a pair of substrates, said process comprising the steps of:
(a) dispensing a curable conductive composition comprising:
  (i) a reactive polyorganosiloxane component;
  (ii) a silicone resin formed as a hydrolysis and condensation product of at least one silane within the formula $R^1{}_{mR}{}^2{}_pSi(X)_{4-(m+p)}$, wherein $R^1$ and P2 may be the same or different and may be selected from the group consisting of monovalent ethylenically unsaturated radicals, $C_{1-12}$ alkoxy, $C_{6-12}$ aryloxy, (meth) acrylate, hydrogen, $C_{1-12}$ alkyl, $C_{6-12}$ aryl, $C_{7-18}$ arylalkyl, and $C_{7-18}$ alkylaryl, X is a hydrolyzable functionality, m is an integer from 1 to 3, and m+p is an integer from 1 to 3 provided at least one of $R_1$ and $R_2$ is a member selected from the group consisting of monovalent ethylenically unsaturated radicals $C_{1-12}$ alkoxy, $C_{6-12}$ aryloxy, (meth)acrylate hydrogen; and (iii) a conductive filler component, wherein the conductive filler component comprise:
   a) a first conductive filler and
   b) a second conductive filler wherein the first conductive filler is relatively harder than the second conductive filler using a Mohs hardness test, wherein the composition is subjected to shear mixing forces which shearingly disperse the first and second conductive fillers throughout the composition so as to provide a volume fraction of conductive filler throughout the resinous material in the range of about 30 to about 65% by volume of the composition and wherein the composition demonstrates an improved initial adhesion to a substrate with which it is to be used of at least about 7% onto a surface of at least one of the substrates;

(b) joining the other substrate therewith; and (c) exposing the joined substrates to conditions favorable to cure the conductive composition.

* * * * *